United States Patent Office 2,739,166
Patented Mar. 20, 1956

2,739,166

PROCESS AND RESULTING COMPOSITIONS

John C. Treacy, Notre Dame, Ind.

No Drawing. Application December 19, 1950,
Serial No. 201,676

8 Claims. (Cl. 260—466)

The present invention relates to an improved process for making alkyl nitrites and alkyl nitrite compositions, and includes compositions prepared by the process.

Prior to the present invention various processes have been proposed for preparing alkyl nitrites, but not have been found completely satisfactory. The yields of the desired nitrite, for example, have been relatively low and the final products obtained have been found to be made up of mixtures of compounds containing, for example, the nitro isomers, and to be contaminated with other hard-to-remove impurities.

The principal object of the present invention is to provide an improved process for making alkyl nitrites free from the disadvantages of the processes available heretofore.

Another object is to provide alkyl nitrite compositions prepared by the process of the present invention.

Other objects of the present invention will be apparent as the description proceeds hereinafter.

The process of the present invention which is characterized by ease of preparation comprises the reaction of nitrogen dioxide with an aliphatic alcohol or mixtures of the same. As the reaction is exothermic, a cooling means, e. g., an ice bath, is preferably used to remove the heat of reaction. The temperature of the reaction mixture remains fairly constant until about ¾ mole of $NO_2$ per mole of alcohol has been added. At this point the reaction mixture turns green, the temperature begins to rise spontaneously and the flow of $NO_2$ gas is stopped. With low boiling nitrites such as methyl nitrite made using methyl alcohol, cooling is not necessary as the nitrite distills continuously during the reaction and is recovered as an impure distillate in a cooled container cooled substantially below the boiling point of the nitrite. With higher boiling nitrites such as the propyl and butyl nitrites made respectively from propyl and butyl alcohols, the temperature of the reaction mixture after stopping the flow of $NO_2$, is allowed to rise (with heating if necessary) to about 70–75° C. when the nitrites distill and are collected as impure distillates. With about ½ lb. of nitrogen dioxide and 1 lb. of alcohol, about 1 lb. of the impure alkyl nitrite distillate is obtained. Additional nitrite may be recovered by fractionating the residue. While the nitrite distillates prepared in accordance with the present invention may be readily purified by fractional distillation, it has been found advantageous when using the nitrite as a diesel fuel additive to employ the distillate in its impure form. The presence of the impurities in this case result in increased cetane numbers and thus have been found to be of the "wanted" type in the diesel fuel field. The reason for this is not fully understood at the present time, although it is known that the impure distillates are contaminated with products of unknown composition.

The following examples will serve to illustrate the present invention:

Example I

Nitrogen dioxide gas at room temperature is bubbled into liquid methyl alcohol in a distilling flask at about 25–30° C. The $NO_2$ is rapidly absorbed in the alcohol and the temperature remains fairly constant. During this period methyl nitrite is distilled from the reaction mixture as formed and is collected in a cool container cooled with Dry Ice. The flow of $NO_2$ is stopped when $NO_2$ gas appears over the solution. The methyl nitrite distillate obtained is contaminated with products of unknown composition. It may be purified by redistillation.

Example II

Nitrogen dioxide gas is bubbled into liquid isopropyl alcohol in a reaction flask cooled to maintain the reaction mixture at about 25–30° C. The temperature of the reaction mixture remains fairly constant, the top temperature being about 30° C. until about ¾ mole of $NO_2$ per mole of alcohol has been added. At this point the reaction mixture turns green, the temperature begins to rise and the flow of $NO_2$ gas is stopped. When the temperature of the reaction mixture reaches approximately 70–75° C., the isopropyl nitrite distills and is recovered as an impure distillate. It too may be purified by redistillation, but is advantageously employed as a diesel fuel additive in its impure form.

Example III

Nitrogen dioxide gas at room temperature is bubbled into liquid n-butyl alcohol in a reaction flask cooled in an ice bath to maintain the reaction mixture at about 30° C. The temperature of the reaction mixture remains fairly constant until about ¾ mole $NO_2$ per mole of alcohol has been added. At this point the reaction mixture turns green and the temperature begins to rise. The flow of $NO_2$ gas is then stopped. When the temperature of the reaction mixture reaches approximately 75° C., the n-butyl nitrite distills and is recovered as an impure distillate. While the reaction mixture normally reaches a temperature of around 75° C. without added heating, heat may be applied if desired to reach the desired distilling temperature. The impure n-butyl nitrite distillate has been found to be a preferred product and to yield an improved cetane number in diesel fuels over and above that obtainable with the purified redistilled n-butyl nitrite. The impure distillate when fractionated gives in addition to the nitrite a fraction boiling at about 105° C. The residue in the flask also yields a fraction boiling above 160° C.

Example IV

In accordance with the above procedures, the secondary butyl nitrite including the impure distillate thereof is prepared by substituting secondary butyl alcohol for the n-butyl alcohol in Example III.

Example V

In accordance with the above procedures, isobutyl nitrite including the impure dsitillate thereof is prepared by substituting isobutyl alcohol for the n-butyl alcohol in Example III.

Example VI

In accordance with the above procedures, the tertiary butyl nitrite including the impure distillate thereof is prepared by substituting tertiary butyl alcohol for the n-butyl alcohol in Example III. In this case it is preferred, after the addition of the $NO_2$, to warm the reaction mixture to 60–70° C. when the nitrite composition auto-distills.

In addition to the nitrites described in the above examples, other nitrites, for example, the ethyl, n-propyl, amyl, hexyl, octyl and decyl, as well as higher alkyl nitrites may be prepared by bubbling the NO₂ gas into the appropriate aliphatic alcohol.

The nitrogen dioxide gas employed in the process of the present invention may be of any concentration, good results being obtained with concentrated NO₂ gas or gas containing as low as 1–2%. In practice, the process has been found to be relatively simple and easy to control, to give high yields of the desired nitrite and to be adaptable for large scale operations.

The process can also be carried out in a continuous manner by introducing the NO₂ and alcohol (in gaseous or liquid form) into a reaction vessel and withdrawing the nitrite compositions as formed, followed by fractionation. Also, a mixed feed containing both NO₂ and NO may be used. In this case the NO is oxidized to NO₂ in the reaction mixture and reacts with the alcohol. Various other modifications will be apparent to those skilled in the art.

I claim:

1. Process for making alkyl nitrite compositions which comprises bubbling nitrogen dioxide gas into a cooled liquid monohydric aliphatic alcohol until the temperature starts to rise and recovering the resulting alkyl nitrite from the reaction mixture.

2. The process for making alkyl nitrite compositions which comprises bubbling nitrogen dioxide gas at room temperature into a liquid monohydric aliphatic alcohol cooled to keep the initial reaction temperature below about 30° C., stopping the flow of nitrogen dioxide when the temperature begins to rise and the color of the reaction mixture turns green, and recovering the alkyl nitrite from the reaction mixture as an impure distillate.

3. The process for making n-butyl nitrite which comprises bubbling gaseous nitrogen dioxide into cooled n-butyl alcohol, stopping the flow of nitrogen dioxide when the temperature of the reaction mixture begins to rise and recovering the resulting n-butyl nitrite from the reaction mixture as an impure distillate.

4. The process for making secondary butyl nitrite which comprises bubbling gaseous nitrogen dioxide into cooled secondary butyl alcohol, stopping the flow of nitrogen dioxide when the temperature of the reaction mixture begins to rise and recovering the resulting secondary butyl nitrite from the reaction mixture as an impure distillate.

5. The process for making isobutyl nitrite which comprises bubbling gaseous nitrogen dioxide into cooled isobutyl alcohol, stopping the flow of nitrogen dioxide when the temperature of the reaction mixture begins to rise and recovering the resulting isobutyl nitrite from the reaction mixture as an impure distillate.

6. The process for making tertiary butyl nitrite which comprises bubbling gaseous nitrogen dioxide into cooled tertiary butyl alcohol, stopping the flow of nitrogen dioxide when the temperature of the reaction mixture begins to rise and recovering the resulting tertiary butyl nitrite from the reaction mixture as an impure distillate.

7. The process for making isopropyl nitrite which comprises bubbling gaseous nitrogen dioxide into cooled isopropyl alcohol, stopping the flow of nitrogen dioxide from the temperature of the reaction mixture begins to rise and recovering the resulting isopropyl nitrite from the reaction mixture as an impure distillate.

8. The process for making alkyl nitrite compositions which comprises contacting gaseous nitrogen dioxide with a liquid monohydric aliphatic alcohol and recovering the alkyl nitrite composition from the resulting reaction mixture.

References Cited in the file of this patent

UNITED STATES PATENTS 2,166,698 Allen _____ July 18, 1939

FOREIGN PATENTS 586,022 Great Britain _____ Mar. 4, 1947

OTHER REFERENCES

Harris et al.: Jour. Am. Chem. Soc., vol. 63, pages 2520–3 (1941).

Mellor: "Modern Inorganic Chemistry," Longmans, Green & Co., New York, N. Y., 1939, pages 420–421.